April 15, 1952 W. M. LEEDS ET AL 2,592,635

CIRCUIT INTERRUPTER

Original Filed Dec. 15, 1943 4 Sheets-Sheet 1

WITNESSES:

W. R. Crout

INVENTORS
Winthrop M. Leeds, Robert E. Friedrich
and Francis J. Fry
BY
Ralph H Swingle
ATTORNEY WITNESSES:
Fred S. Wilham
W. R. Croot INVENTORS
Winthrop M. Leeds, Robert E. Friedrich
and Francis J. Fry
BY
Ralph H Swingle
ATTORNEY

CIRCUIT INTERRUPTER

Original Filed Dec. 15, 1943 4 Sheets-Sheet 3

WITNESSES:

INVENTORS
Winthrop M. Leeds, Robert E. Friedrich
and Francis J. Fry
BY
ATTORNEY

April 15, 1952 W. M. LEEDS ET AL 2,592,635

CIRCUIT INTERRUPTER

Original Filed Dec. 15, 1943 4 Sheets-Sheet 4

INVENTORS
Winthrop M. Leeds, Robert E. Friedrich and Francis J. Fry
BY
Ralph H. Swingle
ATTORNEY Patented Apr. 15, 1952 2,592,635

UNITED STATES PATENT OFFICE 2,592,635

CIRCUIT INTERRUPTER

Winthrop M. Leeds and Robert E. Friedrich, Pittsburgh, Pa., and Francis J. Fry, Champaign, Ill., assignors to Westinghouse Electric Corporation, East Pittsburgh, Pa., a corporation of Pennsylvania Continuation of application Serial No. 514,366, December 15, 1943. This application February 5, 1948, Serial No. 6,436

11 Claims. (Cl. 200—150)

This invention relates to circuit interrupters in general, and more particularly to arc extinguishing structures therefor and is a continuation of our application Serial Number 514,366, filed December 15, 1943, now abandoned.

An object of our invention is to provide an improved circuit interrupter which utilizes a novel method for interrupting charging currents. As a result of a utilization of our improved method for interrupting charging currents, we are able to interrupt high voltage circuits, such as 230 kv., with very short arcing time employing only two arc extinguishing units in a tank. By utilizing only two arc extinguishing units there results greater simplicity of construction, and consequently the first cost and the maintenance expense of the interrupter is reduced.

Another object of our invention is to devise an improved circuit interrupter of the type utilizing a pressure-generating break and an interrupting break, the pressure-generating break normally forcing fluid under pressure toward the interrupting break to cause the interruption of load currents or short circuit currents. In our structure we utilize the interrupting ability of the pressure-generating break together with the interrupting ability of the interrupting break to effect the extinction of arcs drawn during the interruption of charging currents where the amperage involved is relatively low.

Another object is to improvise a novel method for interrupting charging currents in circuit interrupters to prevent overvoltage surges on the transmission line.

A further object is to provide an improved circuit interrupter in which a delayed fluid moving means is brought into action to interrupt charging currents at a predetermined time after contact separation. This time delay should fall within a time range which has precise limits and which is hereinafter disclosed.

Another object is to employ an improved delayed action piston having for its sole object the interruption of charging currents or like currents of a similarly low magnitude, which piston is not operative during the interruption of either heavy load currents or short-circuit currents.

The novel method which we disclose for interrupting charging currents may be employed in circuit interrupters of widely variant construction. This method need not be confined in its use to a circuit interrupter of the type which we specifically disclose, but this novel method for interrupting charging currents may be employed on any circuit interrupter after suitable experimental data concerning the characteristics of such an interrupter are known.

Further objects and advantages will readily become apparent upon a reading of the following specification taken in conjunction with the drawings; in which.

Figures 1, 19, 20, 21, 22, 23:
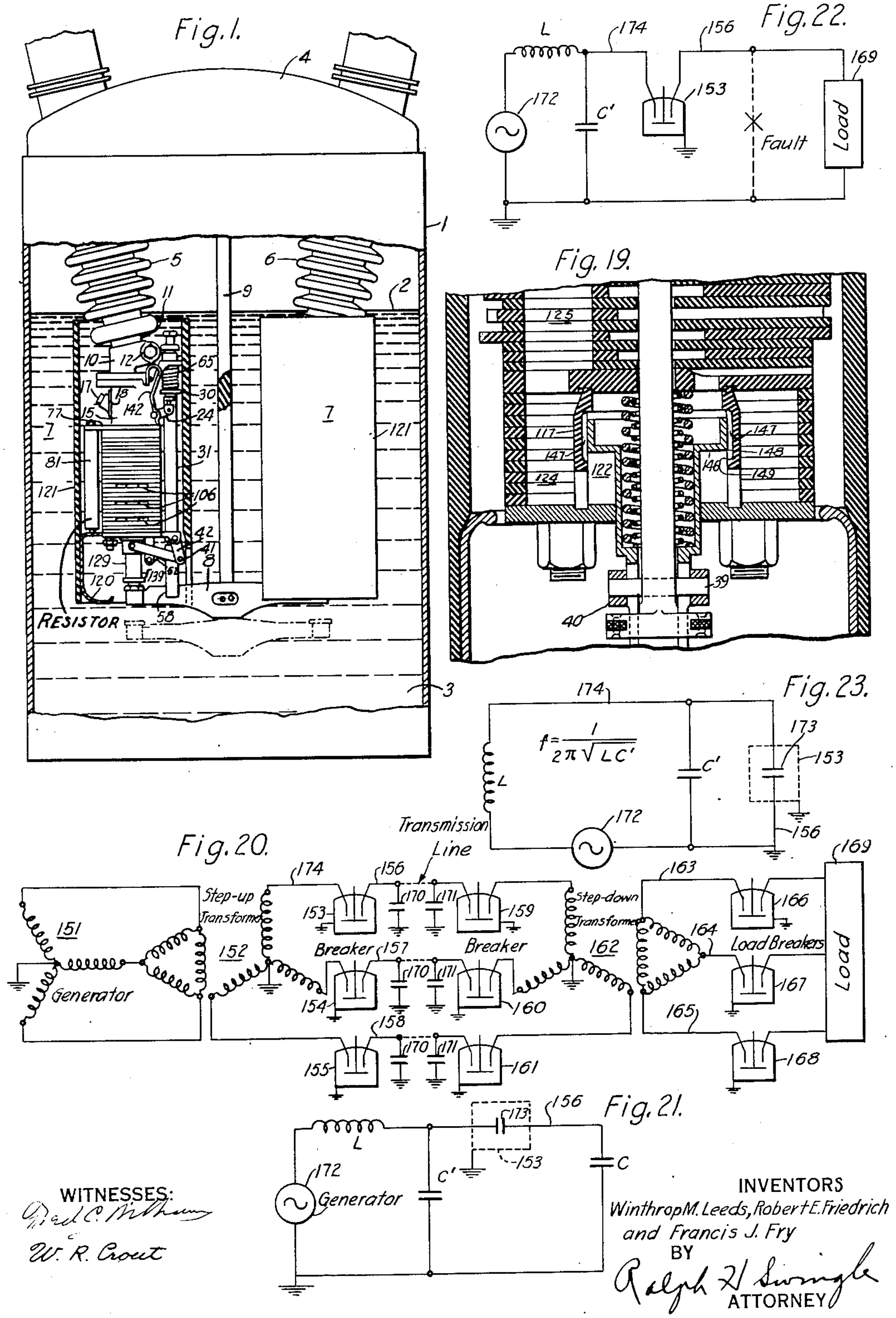
Figure 1 is an elevational view, partly in section, of a circuit interrupter embodying our invention, one of the insulating shields surrounding one of the arc extinguishing units being cut away to show more clearly an elevational view of one of the arc extinguishing units, the interrupter being shown in the closed circuit position.
Fig. 19 shows a modified type of delayed action piston which may be employed in place of the piston shown in Figs. 2 and 3.

Fig. 20 schematically shows an electrical circuit for transmitting power from suitable generating equipment across transmission lines to a suitable load circuit;

Fig. 21 is a simplified schematic diagram showing the circuit parameters present during the interruption of charging currents in the circuit of Fig. 20;

Fig. 22 is a simplified diagram showing the circuit parameters that are present during the interruption of a short circuit current following the existence of a fault;

Fig. 23 is a schematic simpified diagram of the circuit shown in Fig. 22 following the existence of the fault; and Figs. 24 through 32 are curves showing the relation of the voltage and current during charging current and short circuit interruptions in the circuit of Fig. 20, assuming different times for actuating the delayed action piston.

Referring to the drawings, and more particularly to Fig. 1, the reference numeral 1 designates a tank filled to the level 2 with a suitable arc extinguishing fluid 3, in this instance oil. Supported by the cover 4 of the tank 1 are two terminal insulators 5, 6 which enclose terminal studs, not shown. Supported at the lower ends of the terminal studs are two arc extinguishing units generally designated by the reference numeral 7 and which are identical in construction.

A bridging member 8 electrically connects the arc extinguishing units 7 and is reciprocally operated in a vertical direction by an insulating operating rod 9, which may be actuated by suitable operating mechanism not shown.

Figures 2, 3:
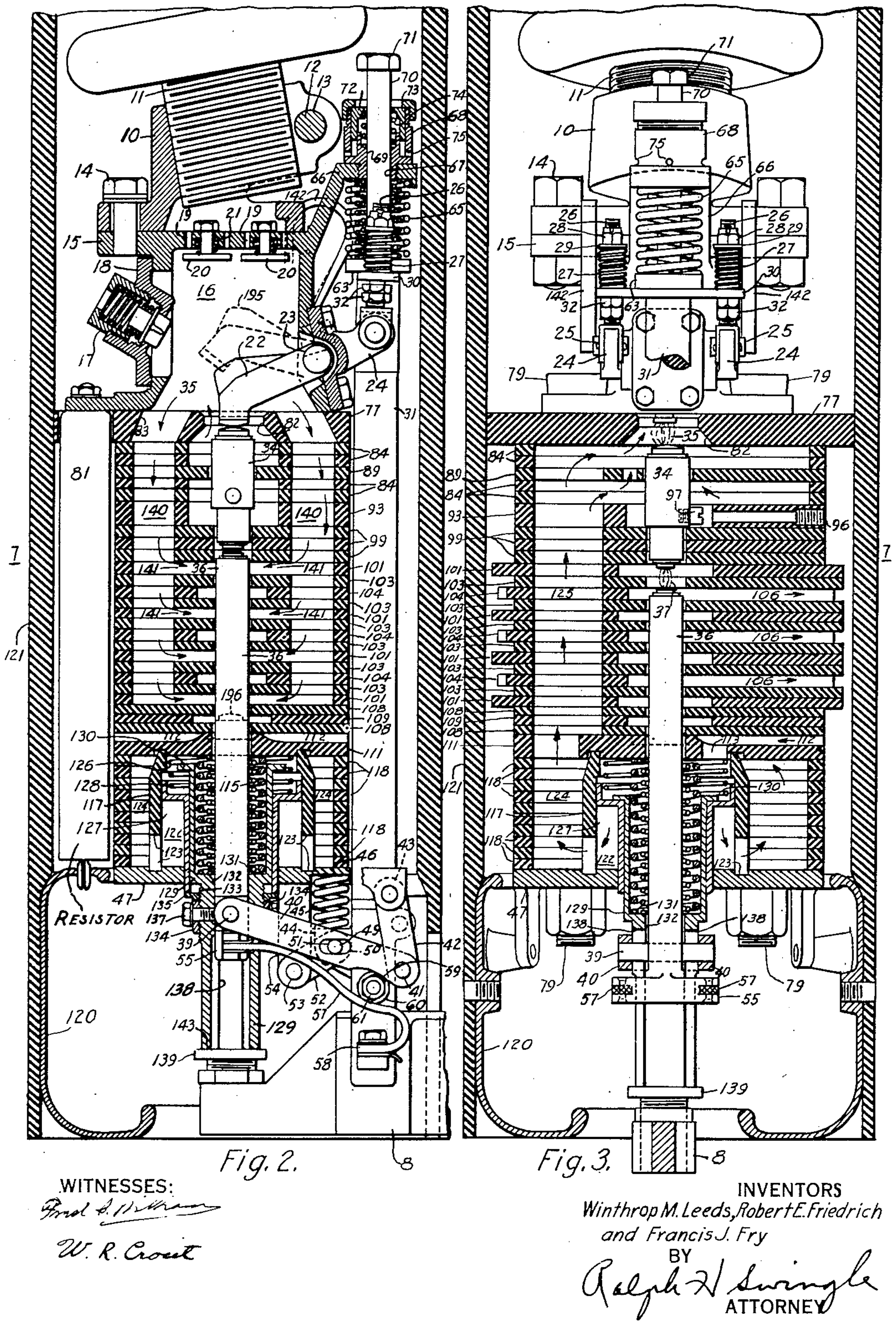
Fig. 2 is an enlarged view in vertical section of one of the arc extinguishing units of Fig. 1, the parts being shown in the closed circuit position.
Fig. 3 is a vertical sectional view of the arc extinguishing unit shown in Fig. 2 taken substantially on the line III—III of Fig. 7 with the portion above the plate 77 shown in full elevation, the parts being shown during the initial portion of the circuit interrupter opening operation.

Referring more particularly to Fig. 2, which shows more clearly the construction of the left-hand arc extinguishing unit 7 of Fig. 1, it will be observed that a contact foot 10 is threadedly secured to the lower end of the terminal stud 11 and may be clamped thereto by a bolt 12 (Fig. 1) which passes through an aperture 13 provided in the contact foot 10. The contact foot 10 supports, by means of suitable screws 14, a top dome casting 15 which forms a pressure-generating chamber generally designated by the reference numeral 16. The pressure-generating chamber 16 has an overpressure relief valve 17 mounted on a removable inspection plate 18 which may serve to vent the pressure-generating chamber 16 upon the attainment of predetermined overpressure conditions within the chamber 16.

Apertures 19 provided in the top dome casting 15 normally vent the pressure chamber 16 to the region exterior of the casting 15 and are controlled by valves 20, which are biased downwardly by suitable compression springs 21 to uncover the apertures 19. As will be explained hereinafter, following the attainment of a predetermined pressure within the pressure-generating chamber 16, the valves 20 will overcome the biasing action of the compression springs 21 and will move upwardly to close the apertures 19.

Operable within the pressure-generating chamber 16 is a pressure-generating contact 22 which is pivotally mounted at 23 to one wall of the dome casting 15. Extending exteriorly of the dome casting 15 and serving to rotate the pressure-generating contact 22 are two actuating arms 24 having their free ends pivoted at 25 to threaded rods 26, about which are encircled compression springs 27. Nuts 28 are threadedly secured on the threaded rods 26 and with washers 29 form upper seats for the compression springs 27. The lower seats for the compression springs 27 are formed by a horizontally extending metallic strip 30 having its ends slidably mounted on the rods 26 and having its central portion rigidly secured to and carried by an insulating operating rod 31. Nuts 32 threadedly secured on the rods 26 determine the lower limit of movement of the strip 30 with respect to the rods 26.

Cooperating with the pressure-generating contact 22 to establish a pressure-generating arc, designated by the reference numeral 35 in Fig. 2, is an intermediate contact 34. Cooperable with the intermediate contact 34 to establish an interrupting arc 37 is a lower movable interrupting contact 36.

The interrupting contact 36 has a pin 39 extending through its lower end which pivotally supports two links 40. The two links 40 have their right ends pivoted at 41 to two links 42, the upper ends of which are pivotally mounted at 43 to fixed pivots. The operating rod 31 has an integrally formed offstanding portion 44 which serves as a lower seat for a compression spring 45, the upper end of which is seated in a cut-out portion 46 of a lower casting plate member 47. A pin 49 extends through an elongated slot 50 formed in the offstanding portion 44. The ends of the pin 49 pass through apertures 51 formed in the two links 40 and also in two guide links 52, the left-hand ends of which, as viewed in Fig. 2, are pivotally supported at 53 to two downwardly extending support portions 54 integrally formed with the lower casting plate member 47. The system of links is designed to restrict motion of the contact 36 to a substantially straight line direction up or down along the axis of the arc extinguishing unit 7. At the lower end of the interrupting contact 36 is threadedly secured a laterally extending member 55, at the ends of which are secured the ends of two flexible conductors 57. The other ends of the flexible conductors 57 are connected to contact jaws 58. The contact jaws 58 are secured to the operating rod 31 by means of two threaded studs 59 about which are encircled two compression springs 60. The outer seats of the compression springs 60 are provided by nuts 61 threadedly secured on the studs 59. The conducting bridging member 8 is adapted to enter between the contact jaws 58 making electrical contact therewith and to abut against the lower end of the operating rod 31 moving the latter upwardly during the closing operation of the interrupter. The compresion springs 60 provide the contact pressure between the bridging member 8 and the contact jaws 58.

The upper portion of the insulating operating rod 31 is, as mentioned previously, rigidly secured to the metallic strip 30. Immediately above the metallic strip 30 is a washer 63 slidable on the rod 31 which serves as a lower seat for a battery of accelerating compression springs 65. The compression springs 65 have their upper seats defined by an offstanding projection 66, in this instance integrally formed with the top dome casting 15. An aperture 67 is provided in the offstanding projection 66. Through this aperture 67 is threadedly secured a guide and piston chamber member 68 having an aperture 69 through which the upper reduced end 70 of the operating rod 31 is guided. A nut 71 is threadedly secured to the top of the portion 70 and serves during the opening movement of the interrupter to engage a piston member 72 movable within the piston chamber member 68 and biased upwardly against a cover 73 by a compression spring 74 encircling the portion 70 of the operating rod 31. Apertures 75 are provided near the lower end of the guide and piston chamber member 68, through which oil may be forced by the downward movement of the piston member 72 to cushion the final portion of the opening stroke of the operating rod 31. During the closing stroke the compression spring 74 raises the piston member 72 drawing oil into the piston chamber 68 through the apertures 75 for the next opening operation.

It will be observed that during the final portion of the closing operation of the interrupter the battery of compression springs 65 will be compressed and the metallic strip 30 will move relative to the rods 26 compressing the compression springs 27 after the pressure-generating contact 22 has engaged the intermediate contact 34. Consequently, the compression of the compression springs 27 provides the requisite contact pressure not only between the pressure-generating contact 22 and the intermediate contact 34 but also between the intermediate contact 34 and the interrupting contact 36.

The plate structure forming the arc extinguishing unit 7 will now be described. Immediately below the top dome casting 15 is an insulating plate 77 and having a configuration more clearly shown in Figs. 4 and 5. It will be observed that the plate 77 has four apertures 78 formed therein for the reception of insulating tie rods 79 more clearly shown in Fig. 3. An aperture 80 is also provided through which passes a resistor tube 81, the latter being employed to divide the voltage equally between the two arc extinguishing units 7 during opening and closing operations of the interrupter. A beveled aperture 82 is provided in the insulating plate 77, together with two inclined apertures 83. Immediately below the insulating plate 77 are two identical insulating plates 84 having a configuration more clearly shown in Fig. 6. The insulating plate 84 has notched portions 85 in which extend the insulating tie rods 79. The plate 84 also has cut-out portions 86 and an enlarged cut-out portion 87, the purpose for which will appear more clearly hereinafter.

Immediately below the two insulating plates 84 is an insulating plate 89 having a configuration more clearly shown in Fig. 7. The plate 89 has notched portions 85, cut-out portions 86, a central aperture 90, four apertures 91 adjacent to the central aperture 90 and four apertures 92, the purpose for which will appear more clearly hereinafter. Immediately below the insulating plate 89 are two insulating plates 84 having a configuration more clearly shown in Fig. 6 and previously described. Below the two plates 84 is an insulating plate 93 having a configuration more clearly shown in Figs. 8 and 9. The plate 93 has notched portions 85, apertures 92 and a central aperture 94. Holes 95 are drilled through the insulating plate 93 as shown in Fig. 8, and the outer ends of the holes 95 are threaded to threadedly receive plugs 96 (Fig. 3). The holes 95 are provided so that one may remove the threaded plugs 96 and insert a screwdriver into a hole 95 to remove a screw 97 from the intermediate contact 34 to permit the removal of the intermediate contact 34 without disassembling the plates forming the arc extinguishing unit 7.

Immediately below the insulating plate 93 are a plurality, in this instance three, insulating plates 99 having a configuration more clearly shown in Fig. 10. The insulating plates 99 have notched portions 85, apertures 92, cut-out portions 86 and a central aperture 100. Immediately below the insulating plates 99 is an insulating inlet plate 101 and having a configuration more clearly shown in Fig. 11. The insulating plate 101 has apertures 78 for accommodating the insulating tie rods 79, apertures 92 and an enlarged cut-out portion 102, the purpose for which will appear more fully hereinafter.

Immediately below the insulating inlet plate 101 is an insulating orifice plate 103 having a configuration more clearly shown in Fig. 12. The insulating orifice plate has apertures 78 to accommodate the insulating tie rods 79, cut-out portions 86, apertures 92 and a central aperture 100. Immediately below the insulating orifice plate 103 is an insulating vent plate generally designated by the reference numeral 104 and shown more clearly in Fig. 13. The insulating vent plate 104 comprises two identically formed plates 105, each of which has apertures 78 for accommodating the insulating tie rods 79, cut-out portions 86 and apertures 92.

When the two plates 105 are assembled on the insulating tie rods 79 they cooperate to form two flared vent openings 106 which lead outwardly from a central region 107 adjacent the interrupting arc 37. Immediately below the insulating venting plate 104 is an insulating orifice plate 103. Then follows a second insulating inlet plate 101, an insulating orifice plate 103, an insulating vent plate 104, an insulating orifice plate 103, a third insulating inlet plate 101, an insulating orifice plate 103, an insulating vent plate 104, an insulating orifice plate 103 and a fourth insulating inlet plate 101. Immediately below the fourth insulating inlet plate 101 is an insulating plate 108 having a configuration more clearly shown in Fig. 14. The insulating plate 108 has notched portions 85, apertures 92 and a central aperture 100.

Figure 17:
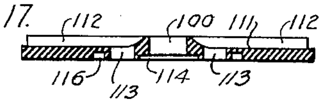

Below the insulating plate 108 is an insulating plate 109 having a configuration more clearly shown in Fig. 15. The insulating plate 109 is identical to the insulating plate 108 except that there is provided a larger central aperture 110. Then follows a second insulating plate 108, below which is positioned an insulating plate 111 and having a configuration more clearly shown in Figs. 16 and 17. The insulating plate 111 has a plurality, in this instance four, grooves 112 communicating with apertures 113, the purpose for which will appear more clearly hereinafter. A central aperture 100 is provided in the insulating plate 111 together with a counterbored portion 114, the latter serving as an upper seat for a battery of compression springs 115 (Fig. 2). An annular groove 116 is provided in the insulating plate 111 to hold in position an insulating cylinder member 117, the purpose for which will appear more clearly hereinafter.

Figures 4, 5, 6, 7, 8, 9, 10, 11, 12, 13, 14, 15, 16, 18:
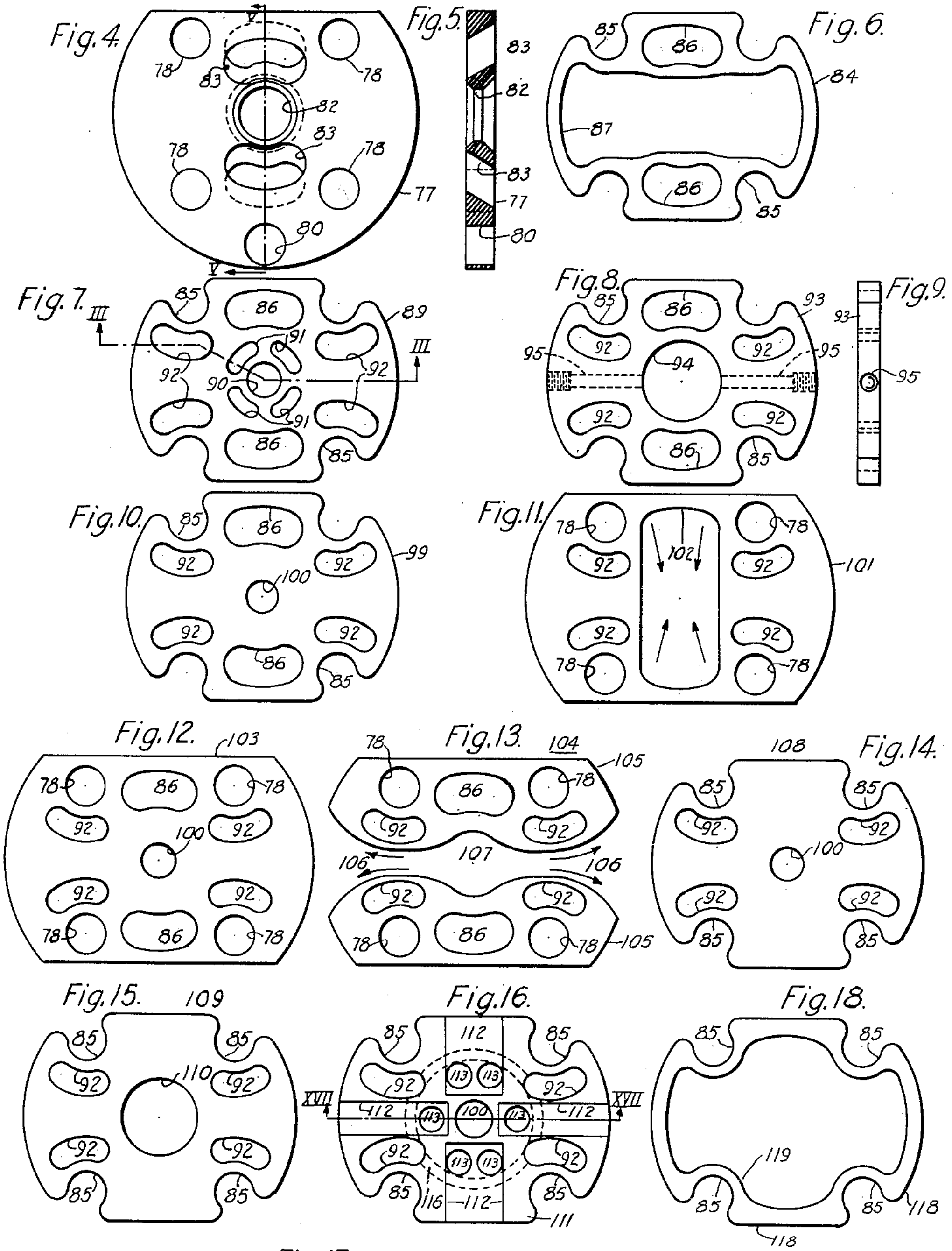
Figs. 4 through 18 show plate details which are stacked to form the arc extinguishing units 7.

Immediately adjacent to the insulating plate 111 are a plurality, in this instance ten, insulating plates 118 having a configuration more clearly shown in Fig. 18. The insulating plates 118 have notched portions 85 and an enlarged cut-out portion 119. Adjacent the lower insulating plate 118 is the lower casting member 47 also held in position by the insulating tie rods 79. An electrostatic shield 120 is secured to the lower casting member 47 by any suitable means such as screws not shown, and the electrostatic shield 120 serves as a seat for the resistor tube 81. Surrounding the electrotatic shield 120 and also surrounding the entire arc extinguishing unit 7 is a cylindrical member 121 composed of insulating material.

The cylindrical member 117 defines a piston chamber generally designated by the reference numeral 122, which communicates through apertures 123 provided at the lower end of the cylindrical member 117 to a region outside of the cylindrical member 117 generally designated by the reference numeral 124. This region 124 communicates through the apertures 92 provided in the several plates which collectively form four vertical flow passages generally designated by the reference numeral 125 (see Fig. 3). The upper end of the vertical flow passages 125 lead by way of the insulating plates 84 to the pressure-generating arc 35 (Fig. 3).

It will be observed that the grooves 112 cooperate with the apertures 113 provided in the insulating plate 111 to permit the region 126 in back of the piston member 127 to be at practically atmospheric pressure. A compression spring 128 biases the piston member 127 downwardly. To actuate the piston member 127 within the piston chamber 122 we have provided a cylindrical member 129 having an upper flange 130, the latter serving to engage the piston member 127 after a predetermined time T and to then cause downward motion of the piston member 127 to force oil out of the piston chamber 122 through the apertures 123 into the region 124 and upwardly through the four vertical flow passages 125 toward the pressure-generating arc 35. A shoulder 131 integrally formed with the cylindrical member 129 serves as a lower seat for the battery of compression springs 115. An aperture 132 provided in the cylindrical member 129 serves as a guide for the interrupting contact 36. A portion 133 of the cylindrical member 129 is threaded to serve as a rack for two diametrically disposed members 134 having shoulder portions 135 serving to engage the piston member 127 and to carry the latter upwardly to its charged position during the closing operation of the interrupter. Two set screws 137 serve to maintain the member 134 in a set position on the rack 133 relative to the cylindrical member 129 after a proper adjustment has been made.

The lower portion of the cylindrical member 129 has two axially extending elongated notches 138 formed therein (Fig. 3) which accommodate the vertical motion of the pin 39 so that contact 36 may be moved independently of the piston 127. A bumper 139 threadedly secured to the end of the conducting bridging member 8 serves to actuate the cylindrical member 129 during the opening and closing operations of the interrupter.

It will be noted that the inclined apertures 83 provided in the insulating plate 77 communicate with the cut-out portions 86 provided in the several plates to form two vertical flow passages generally designated by the reference numeral 140 in Fig. 2. These two vertical flow passages 140 communicate with eight inlet passages 141 leading toward the interrupting arc 37. The inlet passages 141 on the same level are provided by the enlarged cut-out portion 102 formed in the insulating plates 101. Consequently, oil under pressure developed by the pressure-generating arc 35, passes downwardly through the vertical flow passages 140 through the inlet passages 141 toward the interrupting arc 37 to contact the interrupting arc 37 and then pass through the central apertures 100 provided in the insulating orifice plates 103, to exhaust out of the flared vent openings 106 provided in the insulating vent plate 104.

Certain aspects concerning the direction of flow of the oil from the pressure-generating arc 35 toward the interrupting arc 37 are disclosed and claimed in a patent application filed November 11, 1942, Serial No. 465,244, by Leon R. Ludwig, Benjamin P. Baker, and Winthrop M. Leeds, now Patent 2,406,469, issued August 27, 1946, and assigned to the assignee of the instant application. Also certain aspects of the structure provided for maintaining the proper contact pressure between the several contacts are disclosed and claimed in the aforesaid application.

After removal of the screw 97, the intermediate contact 34 may be removed from the arc extinguishing unit 7 through the inspection plate 19 without disassembling the unit 7. This feature is disclosed and claimed in a patent application filed April 2, 1943, Serial No. 481,529, now United States Patent 2,420,888, issued May 20, 1947, to Winthrop M. Leeds and assigned to the assignee of the instant application.

The operation of the interrupter will now be explained. In the closed circuit position of the interrupter, as shown by the full lines in Fig. 1 and in Fig. 2, the electrical circuit therethrough includes the left-hand terminal stud 11, contact foot 10, top dome casting 15, flexible conductor 142, actuating arms 24, pressure-generating contact 22, intermediate contact 34, interrupting contact 36, laterally extending portion 55, flexible conductors 57, contact jaws 58, conducting bridging member 8 to the right-hand arc extinguishing unit 7, through which the electrical circuit passes in an identical manner to the right-hand terminal stud, not shown. When it is desired to open the electrical circuit passing through the interrupter, or in response to overload conditions existing in the electrical circuit controlled by the interrupter, suitable operating mechanism, not shown, is actuated to cause downward movement of the insulating operating rod 9. The downward movement of the operating rod 9 causes downward movement of the conducting bridging member 8 and the bumper 139. The downward movement of the member 8 permits the compression spring 45 and the battery of compression springs 65 to cause downward motion of the operating rod 31. The downward motion of the operating rod 31 causes, by virtue of the pin 49 and two links 40, downward movement of the movable interrupting contact 36. Simultaneously the downward movement of the bumper 139 permits downward motion of the cylindrical member 129, which, because of the lever action caused by the two links 40, moves at a slower downward speed than the interrupting contact 36.

During this time the piston member 127 remains stationary because the compression spring 128 is relatively weak and is not able to overcome the inertia of the oil disposed in the piston chamber 122. Also during this time the bridging member 8 remains in electrical contact with the jaws 58; in fact, the downward speed of the bridging member 8 determines the downward speed of the operating rod 31. Furthermore, during this initial downward movement of the operating rod 31 the metallic strip 30 slides downward on the rods 26 relieving the contact pressure by permitting extension of the compression springs 27 until the metallic strip 30 strikes the nuts 32, at which time clockwise pivotal rotation of the pressure-generating contact 22 takes place about the pivot point 23. The net result is a practically simultaneously drawing of both a pressure-generating arc 35 and an interrupting arc 37.

This opening motion continues until the flange 130, moving downwardly at a speed dependent on the downward motion of the bumper 139, strikes the piston member 127, thus causing the combined biasing action of the compression spring 128 and the compression springs 115 to bias the piston 127 downwardly. Whether the piston 127 in fact moves downwardly depends on the amperage of the current being interrupted. During the interruption of heavy load currents and short circuit currents the piston 127 will not move downwardly because of the high pressure conditions present in the pressure-generating chamber 16 which communicates with the chamber 122 under the piston 127. However, during the interruption of charging currents, light load currents, or magnetizing currents, where the amperage involved is relatively low, the piston 127 will move downwardly because of the low pressure conditions present in the pressure-generating chamber 16. Of course, the pressure conditions existent in the pressure-generating chamber 16 are a function of the amperage passing through the pressure-generating arc 35.

If the interrupter is breaking a heavy load current or a short circuit current, the pressure within the pressure-generating chamber 16 will be high and the piston 127 will not move downwardly, the combined biasing action of the compression springs 128, 115 not being sufficient to overcome the high pressure conditions within the pressure-generating chamber 16. In this event, the piston 127 and the cylindrical member 129 will temporarily remain stationary, or even back up to the maximum overtravel position of the piston 127. Hence, the bumper 139 will separate from the lower end 143 of the cylindrical member 129, the interrupting contact 36, however, continuing its downward movement by virtue of the compression spring 45 and the grooves 138. The rod 31 will continue to move downwardly until the nut 71 is stopped by the piston member 72 striking the member 68.

During the interruption of heavy load currents and short-circuit currents, the valves 20 will close and high pressure will exist in the pressure-generating chamber 16 because of the high amperage passing through the pressure-generating arc 35. This high pressure existent within the pressure-generating chamber 16 will place the oil disposed therein under pressure and will cause downward movement of the oil through the two inclined apertures 83, through the two vertical flow passages 140, through the inlet passages 141 to contact the interrupting arc 37 as the oil passes through the orifices 100 disposed in the insulating orifice plates 103 to exhaust out the flared vent openings 106 provided in the insulating vent plates 104. As a result of this flow of oil, the interrupting arc 37 will be extinguished, and the electrical circuit through the interrupter will be broken. This extinguishing action takes place before the conducting bridging member 8 separates from the jaws 58 to move to a position indicated by the dotted lines in Fig. 1, thus introducing two isolating gaps in the electrical circuit.

The resistor tubes 81 having relatively high resistance value are provided to divide the voltage properly across the two arc extinguishing units 7. Since the resistances of the two resistor tubes 81 are relatively high, the residual current passing therethrough after extinction of the arcs is relatively low and of a sufficiently low value so that breakage of this residual current by the bridging member 8 separating from the jaws 58 will not cause deleterious results. The overpressure relief valve 17 limits the pressure attained in the pressure-generating chamber 16 to a safe value.

After the interrupting process is completed and after the conducting bridging member 8 has introduced two isolating gaps into the circuit, as indicated by the dotted lines in Fig. 1, the escape of gas out of the flared openings 106 causes a reduction of pressure within the pressure-generating chamber 16 and the biasing action exerted by the compression spring 128 and the battery of compression springs 115 is sufficient to force the piston member 127 downwardly until the latter strikes the lower casting member 47, thus sending a flushing flow of oil from the piston chamber 122 through the apertures 123 provided in the cylindrical member 117 into the region 124, and upwardly through the four vertical flow passages 125 and into the region adjacent the contacts 22, 34. The interrupting process is at this point completed. It will be observed that the nut 71 disposed at the top of the insulating rod 31 strikes the piston member 72 to cushion the final portion of the downward opening movement of the operating rod 31.

The above description assumes either an interruption of heavy load currents or an interruption of short-circuit currents in which the amperage is relatively high and consequently the pressure produced in the pressure-generating chamber 16 is also high. This high pressure causes a rapid flow of oil under considerable pressure toward the interrupting arc 37 to quickly extinguish the same. During the interruption of charging currents, light load currents or magnetizing currents, on the other hand, the amperage involved is relatively low, say of the order of 50 or 100 amperes, and consequently the pressure produced in the pressure-generating chamber 16 is of a relatively low value. This low pressure attained in the interruption of charging currents or other light currents is not sufficient to effect a rapid flow of oil toward the interrupting arc 37 and consequently interruption of the interrupting arc 37 may be delayed. In interrupting charging currents, this may result in arc restriking and a consequent production of overvoltage. This is especially true where only two arc extinguishing units 7 are provided in each phase of a transmission line for interrupting high voltages, say of the order of 230 kv.

During the interruption of charging currents, therefore, when the pressure produced by the pressure-generating arc 35 is relatively low, the biasing action exerted by the compression spring 128 and the battery of compression springs 115 is sufficient to force the piston member 127 downwardly to cause oil to flow upwardly through the vertical flow passages 125 and toward the pressure-generating arc 35. We thus take advantage of the interrupting ability of the pressure-generating arc 35 during the interruption of charging currents or other light currents. Furthermore, since oil is relatively incompressible the downward movement of the piston 127 not only forces oil under pressure toward the pressure-generating arc 35 but also forces oil downwardly through the vertical flow passages 140, through the inlet passages 141 toward the interrupting arc 37. It will, therefore, be apparent that during the interruption of charging currents or other light currents, the downward movement of the piston member 127 permits advantage to be taken of interrupting ability developed in both the pressure-generating gap and the interrupting gap. During the interruption of high amperage currents, such as heavy load currents or short-circuit currents, the effective deionization for interruption largely takes place at the interrupting arc 37. It is only during the interruption of charging currents, light load currents, or magnetizing currents, that interruption is greatly aided by deionization in the pressure-generating arc 35.

Consequently, during the interruption of charging currents, light load currents, or magnetizing currents, at which time the piston member 127 is movable, it will be observed that there is a time delay T following separation of the contacts 34, 36 before the flange 130 causes downward movement of the piston member 127. As will be more fully explained hereinafter the particular time delay T before the piston 127 becomes operative during the interruption of charging currents is very important. Thus, in Figs. 2 and 3 we show a delayed acting piston which is operative only during the interruption of charging currents or other light currents, and which is not operative during the interruption of heavy load currents or short circuit currents.

In the delayed acting piston arrangement shown in Fig. 19, which may be used in place of the delayed acting piston arrangement previously described, there is shown a modified type of piston member 146 movable in the piston chamber 122, there being provided a plurality of by-passing channels 147 which makes the piston ineffective in pumping oil out of the piston chamber 122 until the edge portion 148 of the piston member 146 has passed the edge 149 of the cylindrical member 117. The lower portion of the piston member 146 has a configuration identical to the lower portion of the cylindrical member 129 previously described. Consequently, in Fig. 19, there is a time delay T following a contact separation before oil is forced out of the piston chamber 122 during the interruption of charging currents or other light currents. As was the case previously, the piston member 146 in Fig. 19 is inoperative during the interruption of heavy load currents or during the interruption of short circuit currents because of the high pressure present in the pressure-generating chamber 16.

The following discussion will set forth what we believe to be the underlying theory applying to the interruption of charging currents, and also we shall set forth the preferred time at which the piston members 146 and 127 will be operative to send fluid out of the piston chamber 122 at a predetermined time after separation of the contact structure.

Fig. 20 schematically shows a complete electrical circuit from the generating equipment to the receiving load equipment. The generator is generally designated by the reference numeral 151 and has the neutral point grounded. The current then passes to a step-up transformer generally designated by the reference numeral 152, the primary winding being delta-connected and the secondary winding being star-connected with the neutral point grounded. The three phases then pass from the transformer 152 to three oil breakers 153, 154, and 155. Each of the oil breakers controls one phase of the circuit.

The transmission lines are designated by the reference numerals 156, 157, and 158. At the other ends of the three transmission lines are another set of three oil breakers 159, 160, and 161 which control the current leading to a step-down transformer generally designated by the reference numeral 162. The primary winding is star-connected with the neutral point grounded, and the secondary winding is delta-connected. The three phases 163, 164, and 165 leading from the secondary winding of the step-down transformer 162 pass through three low voltage oil breakers 166, 167, and 168 which control a load receiving circuit generally designated by the reference numeral 169. The distributed capacitance between the transmission lines 156, 157, and 158 and the ground is shown as lumped into two capacitors 170 and 171 for each line.

In the interruption of charging currents, the conditions are initially such that the oil breakers 153, 154, and 155 are closed whereas the oil breakers 159, 160, 161 are open. Referring to Fig. 21 which schematically shows one phase of such a circuit, it will be observed that the generator is designated by the reference numeral 172, L represents the reactance of the generator, the oil breaker is designated by the reference numeral 153, the summation of the contact gaps of the oil breaker 153 in Fig. 20 being designated by the gap 173 in Fig. 21, and C represents the lumped distributed capacitance 170 and 171 of Fig. 20 between the transmission line 156 and the ground in Fig. 21. This capacitance C is very large compared to the capacitor C′ between line and ground on the generator side of the breaker 153.

Referring to Fig. 22, we show an alternating current generator controlled by the circuit interrupter 153 feeding a reactive load 169. The circuit in Fig. 22 is considerably simplified over the more elaborate circuit shown in Fig. 20. L, as in Fig. 21, indicates the reactance of the generator 172 and C′ indicates the lumped distributed capacitance in the windings of the generator and between the line 174 and the ground. With the oil breaker 153 closed (a fault not yet having occurred) a sinusoidal current passes through the load. Since the load is partly reactive the current lags the generated voltage by a small angle. If a fault occurs, as indicated in Fig. 22 by a short between the transmission line 156 and the ground, the result is a large current flow through the oil breaker 153 limited principally by inductive reactance. This large fault current will trip the breaker operating mechanism to result in the contacts of the oil breaker 153 opening. Fig. 23 schematically shows a simplified diagram of Fig. 22 after a fault has occurred and has grounded the transmission line 156. The summation of the contact gaps in the oil breaker 153 is indicated by the separation 173 in Fig. 23.

The problem of interrupting line charging currents is very different from the problem of interrupting normal load currents or fault currents. Assume in Fig. 20 that the breakers 153, 154, and 155 are closed and that the breakers 159, 160, and 161 are open. Because of the distributed capacitance between the transmission lines 156, 157, and 158 to ground (represented by the capacitances 170, 171) there will result a charging current passing through the breakers 153, 154, and 155 which leads the generated voltage by approximately 90 electrical degrees. Assume further that it is desired to open the breakers 153, 154, and 155 to remove the voltage from the transmission lines 156, 157, and 157, and consider during such an opening operation the voltage, current and arc voltage related with breaker 153. Fig. 21 shows a simplified circuit with C being the lumped distributed capacitance between transmission line and ground, that is, capacitance 170 plus capacitance 171 (Fig. 20), and L represents the reactance of the generator. C′ represents the lumped distributed capacitance in the windings of the generator 172 and between the line 174 and ground. Since C′ is very small compared with C, it may be neglected.

The reference numeral 173 indicates the summation of the contact separations in the breaker 153; for example, in Fig. 1, 173 would be the sum of the two pressure generating gaps and the two interrupting gaps for the oil breaker in Fig. 1.

Figures 24, 25, 26, 27, 28, 29, 30, 31, 32:
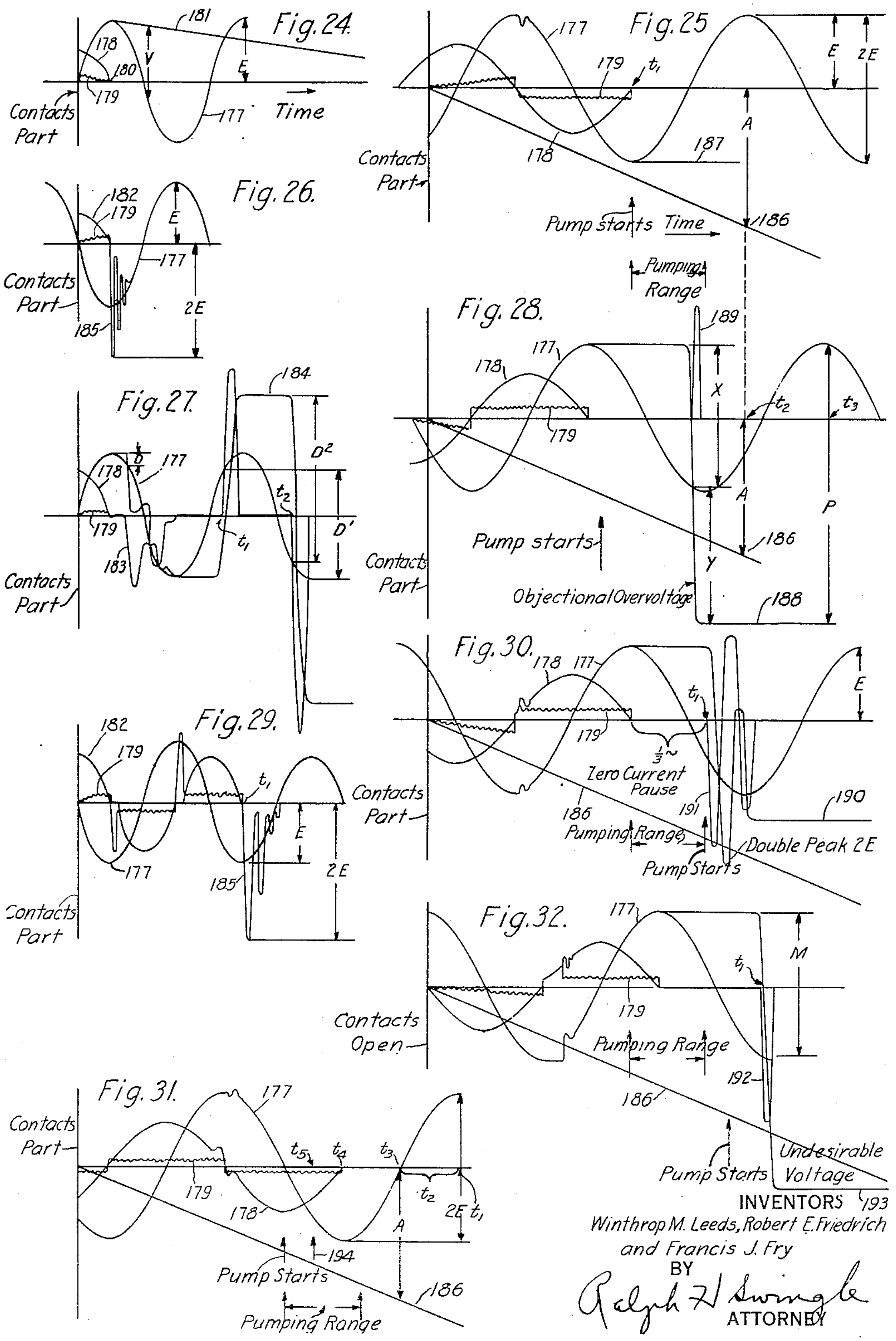

Assume that the charging current passing through the breaker 153 is interrupted at the first current zero after the contacts part, as indicated in Fig. 24. In Fig. 24, 177 indicates the generated voltage, and 178 indicates the charging current passing through breaker 153 which leads the generated voltage 177 by substantially 90 electrical degrees because of the capacitance load C. The arc voltage is represented by the reference numeral 179. At the time indicated by the numeral 180, the charging current 178 passes through zero, and the circuit is broken, the voltage then existing across the contact gap 173 varying from zero to substantially twice normal peak E, as indicated by the difference V between the line 181 (the potential on the line 156) and the generated voltage wave 177. The potential on the line 156 leaks off gradually to ground, thus resulting in the negative slope of the line 181. Thus, in time the line 181 will reach zero which indicates that C is discharged; thereafter the potential across the contact gap 173 will merely be the sinusoidal generated voltage.

Assume in Fig. 20 that all of the breakers 153, 154, 155, 159, 160, 161, 166, 167 and 168 are closed. A load current then passes through the breaker 153. Fig. 22 shows a simplified circuit of the same arrangement. Assume further that a fault occurs grounding the transmission line 156, as indicated by the fault connection in Fig. 22. After the fault has grounded the transmission line 156, a simplified circuit would be that shown in Fig. 23. Because the fault current flowing through the breaker 153 is limited principally by the reactance L, it will lag the generated voltage by substantially 90 electrical degrees. It will be observed that the contact gap 173 is in parallel with the capacitance C′, which as before represents the lumped distributed capacitance in the windings of the generator 172 and between the line 174 and ground. Thus, we have an oscillating LC circuit which has a natural frequency of oscillation, when electrically disturbed, given by the relation $$=\frac{1}{2\pi\sqrt{LC'}}$$

Fig. 26 shows the interruption of such a fault current at the first current zero after contact part. The arc voltage 179 across the contacts 173 attempts to assume the generated voltage 177 when the fault current 182 comes to zero, but overshoots because of the oscillating circuit to a theoretical amplitude of 2E assuming no damping. Finally the voltage across the contact gap 173 settles down to the generated voltage 177.

It is apparent from the above, comparing the curves in Figs. 24 and 26 that the rate of dielectric build-up after current zero need be comparatively slow for charging currents, whereas the dielectric build-up after a fault current or a load current zero must be very rapid if the circuit is to be interrupted. Assuming the same current in either case, it is evident that with an interrupter which utilizes no pistons for forcing oil into the arc region, that the break distance for interrupting the load current should be longer than the break distance for interrupting the charging current since the time for the same voltage difference to appear across the arc space is very much shorter, and the ability to build up adequate dielectric strength at this higher rate must be gained at the expense of more break distance.

In the interruption of load currents or fault currents, the breaker will continue to arc until there is sufficient dielectric ability at a current zero to withstand the transient recovery voltage. The fact that at each succeeding current zero there is built up a greater dielectric ability does not impose any hardship on the system to which the breaker is connected since a breakdown on the transient recovery voltage merely results in another half cycle of arcing, and at the next current zero, the system conditions affecting interruption are practically unchanged.

In the interruption of charging currents, on the other hand, the greater dielectric ability at succeeding current zeros can be very harmful to the system since successive restriking of the arc may build up excessive voltage surges on the system. Because of the comparatively slow rate of imposition of voltage across the breaker in the case of a charging current interruption, the breaker will start to interrupt the circuit at very short contact separation, and, depending on the contact speed and interrupter characteristics, voltage will build up until the dielectric strength in the interrupter is exceeded. This results in a restrike and an associated transient period during which time the charged transmission line is brought to the potential of the generator. The deleterious effects of continued restriking during a charging current interruption are shown in Fig. 27.

At the first current zero there is a current pause, or time during which the breaker current is zero, but the contact gap 173 is not able to withstand more than the voltage difference D and a restrike occurs, the breaker current then building up at 183 for another half cycle of arcing. At the next current zero the current pause is longer. It will be observed, therefore, that the length of time of the current pause is a measure of the dielectric strength across the contact gap 173. Since the contact gap 173 at the time $t_1$, cannot withstand the voltage difference D′, a second restrike occurs with a remainder of a half-cycle of charging current flowing through the breaker 153. Now the voltage that is trapped on the line 156 due to the overswing which occurred during the second restriking is represented by the potential 184. When the generated voltage 177 now changes its polarity, there is impressed a voltage difference of $D^2$ across the contact gap 173, which, despite the greater contact gap and increased dielectric ability, nevertheless breaks down at time $t_2$ to result in an overvoltage swing so that the potential now existing on the line 156 is greater than twice normal peak voltage. This voltage may indeed be trapped on the transmission line 156 when the current surge is extinguished because of the large contact gap 173 existing at this time. This high potential on the transmission line 156 puts an undesirable electrical strain on the insulators supporting the transmission line 156. Thus, continued restriking during a charging current interruption may lead to trapping an undesirable high voltage on the transmission line 156.

Fig. 29 shows the effect of continued restriking during the interruption of a short circuit current. Again the reference numeral 177 represents the generated voltage wave, 179 the arc voltage across the contact gap 173, and 182 the fault current being interrupted. The arc restrikes at the first and second current zeros after contact separation because the dielectric strength of the contact gap 173 during these two times is not sufficient to withstand the recovery voltage. The circuit is finally interrupted at the third current zero, the dielectric strength of the contact gap 173 at this time $t_1$, being sufficient to withstand the recovery voltage transient 185 which, assuming no damping in the circuit of Fig. 23, would swing to substantially 2E. When the recovery transient dies out, the voltage across the contact gap 173 is simply the generated voltage 177. It will be observed that there are no undesirable effects resulting from continued restriking of the fault current as there were during continued restriking of the charging current in Fig. 27. In Fig. 27, the voltage of the system may become prohibitive if the restriking continues on the charging current interruption. From a comparison of Figs. 27 and 29, it can be seen that the interruption of charging currents is not one of just finally interrupting the circuit, but it has the additional restriction imposed that the system voltages must not become prohibitive.

There are various ways of dealing with the problem of charging current interruptions. In a fluid filled interrupter there can be placed a great number of interrupting units in series, and by keeping the voltage per unit very low, it would be possible to interrupt the charging current with no restriking. The number of series interrupters would be very great if there were no fluid driving pistons in the interrupters. If there are fluid driving pistons involved, the number of series interrupters may be small or large, depending on how the problem is approached. If the first current zero after contact separation is to be the interruption point, it is necessary to have very powerful pistons coupled with several series interrupters. As the pistons become less powerful, the number of series interrupters must increase.

The idea of a delayed piston however meets an essential requirement of our particular oil breakers, since, with our modern interrupters, only two grids per pole are necessary for fault or load current interruptions. This is true for breakers up to and including 230 kv.

Delayed action pistons have been used on interrupters for heavy load current and fault current interruptions. It was realized that if the voltage per interrupting unit is high, it is useless to pump oil with the hope of interrupting before the contacts have separated sufficiently. In order to keep the arc energy low, the pumping is delayed until an opportune time for interruption. The time to start pumping is, therefore, determined on the basis of lagging power factor faults.

To secure satisfactory charging current interruption it is necessary to approach the idea of delayed action from the point of view of charging currents entirely. The delay for charging current interruptions will always be less than the delay to give least arc energy on short circuit lagging power factor current interruptions.

Interrupters using a self-generated oil flow from a series pressure break for short circuit interruption can have a small piston for charging current interruption adjusted for the proper delay, whereas interrupters relying on piston driven oil flow for all currents must use a compromise piston delay adjustment.

Interrupters with powerful pistons and multibreaks have been mentioned. These interrupters clear the charging current at the first zero after contact part practically every time. With this type interrupter no overvoltages are experienced on opening the circuit; however, the imposition of a no-overvoltage restriction on a charging current opening is not logical since voltages of two times normal may be obtained on energizing a transmission line, while on power faults the a transient voltage may also be two times normal. With this in mind the requirement for an interrupter might well contain the limitation that overvoltages be restricted to two times normal voltage.

If a restrike were to occur at the peak of the power frequency generated voltage, during a charging current interruption, that is, if the contact gap 173 broke down when the voltage V (see Fig. 24) impressed thereacross was 2E, the voltage overswing on the transmission line 156 would be 4E below the line 181 in Fig. 24 or an overvoltage on the transmission line 156 approaching three times normal peak voltage. This is undesirable.

We have discovered that the movement of the piston member 127 in Figs. 2 and 3 should have a time delay T, or the by-passing channels 147 in Fig. 19 should be of such a length that the fluid flow out of the piston chamber 122 should be delayed to a certain time T after contact separation. This time delay T, at which fluid is forced out of the piston chamber 122 after the moment of contact separation, may fall within a particular time range hereinafter disclosed which has fairly precise limits.

The earliest limit of this time range or pumping range is ½ cycle before a contact separation 173 is reached sufficient to withstand double normal peak voltage (2E) applied to the contact separation 173 for a few seconds when filled with clean oil. The delayed fluid moving means or piston must be sufficiently strong to develop substantially the full dielectric strength of the contact gap 173 at any particular contact separation in less than ½ cycle after pumping begins.

The latest limit of this time range or pumping range is that time in the contact stroke corresponding to a contact gap 173 at which, without pumping, restrikes during charging current interruptions take place after zero current pauses as long as ⅓ cycle. This limit, however, has been found to be less critical than the earliest permissible time pumping may begin. Stated in other words, pumping should not be delayed longer than the time required to obtain approximately twice the contact separation obtained at the earliest time pumping may begin. As was mentioned previously in connection with the discussion of the charging current interruption shown in Fig. 27, the length of time of the zero current pauses is a measure of the dielectric ability of the contact gap 173 and hence depends on the time after contact separation. Theoretically if a restrike occurs during a charging current interruption after ⅓ cycle zero current pause the overvoltage swing on the transmission line 156 is twice normal peak voltage or 2E. This is not too severe a voltage to impose on the line 156 since the amplitude of the high frequency recovery voltage transient 185 in Figs. 26 and 29 without damping approachs 2E as shown.

Figs. 25, 28, 30, 31, and 32 are all curves of charging current interruptions showing the importance of the above pumping range, and clearly indicating the undesirable results which occur if the time of initiating the fluid flow or pumping is outside of the specified pumping range. These curves are all drawn to the same scale and the zero point is taken at the moment of contact separation. The generated voltage is designated by the reference numeral 177. The charging current is designated by the reference numeral 178, and the arc voltage across the contact gap 173 by the reference numeral 179. The amplitude of the line 186 designates the length of the contact gap 173.

Referring to Fig. 25, the contact gap A indicates a separation of the contacts 173, which, if filled with clean oil, can withstand 2E. The earliest point for the pumping to begin is, therefore, ½ cycle before this time. Fig. 25 shows the earliest time at which the pump should start pumping, and assuming that the pump does start at this earliest time the contact gap 173 of a separation of A has a sufficiently high dielectric ability to withstand a voltage difference of 2E. Thus, the circuit is interrupted at the time $t_1$ and the potential 187 remains on the line 156. This charge on the capacitance C gradually leaks off so there is a slight decay of the voltage 187. This decay is exaggerated by the slope of the line 181 in Fig. 24. Ultimately the capacitance C is discharged and the potential across the contact gap 173 is merely the generated voltage 177.

Fig. 28 shows the effect of pumping too soon, that is the pump starts before the earliest limit of the specified pumping range. It is obvious that the moment of contact part bears no relation to the instantaneous current and voltage relations at this time. Current zeros may, therefore, fall anywhere within a half cycle range. It is assumed in Fig. 28 that a current zero falls earlier than that of Fig. 25. The flow of oil caused by the pump helps to build up the dielectric ability of the contact gap 173, but by our assumption the contact gap 173 must be of length A at time $t_2$ and filled with clean oil before the gap 173 can withstand 2E. Thus, the early starting of the pump in Fig 28 not only is useless but actually is harmful in that it permits a voltage difference of X to build up across the gap 173, the result being a bad restrike which imposes the high voltage 188 on the transmission line 156. A surge of charging current 189 results from this bad restrike. The reason that the voltage 188 often remains trapped on the transmission line 156 is that the voltage impressed across the contact gap 173 after the bad restrike is merely the value denoted by Y, which voltage difference the contact gap 173 may be able to withstand. When the generated voltage 177 reverses polarity to increase the voltage difference across the contact gap 173, say to the value P at time $t_3$, the contact gap may or may not be sufficient at this time to withstand this high voltage difference. The net result is that a high voltage is likely to be trapped on the transmission line 156 which imposes a severe electrical strain on the insulators, etc. supporting the transmission line 156.

Fig. 30 shows the latest limit of the pumping range and shows the effects produced when the pump is started at the latest possible time. The pump is started at the end of the ⅓ cycle zero curent pause. The restrike which occurs at this time $t_1$ results in an overvoltage swing on the transmission line 156 which is theoretically 2E, which imposition of voltage is not too severe on the system. The voltage which is finally trapped on the transmission line 156 is designated by the reference numeral 190 which is not much over normal peak voltage E. Furthermore, this voltage 190 will decay as the condenser C is gradually discharged by leakage through the insulators, etc. The momentary charging current surge caused by the restrike at $t_1$ is designated by the reference numeral 191.

Fig. 32 shows the effect of pumping too late. A current zero is assumed to take place after that which is shown in Fig. 30. It is seen that the late pumping does not build up a sufficient dielectric ability in the contact gap 173 to withstand the voltage across the contact gap 173 of a value M at a time $t_1$. A bad restrike results therefore at time $t_1$ with a corresponding charging current surge designated by the reference numeral 192. The consequence is that a high negative voltage 193 is trapped on the transmission line 156 straining the supporting equipment.

Fig. 31 shows a charging current interruption with the pump starting at the earliest time within the specified pumping range. A current zero is assumed to take place before that taken in Fig. 25. The dielectric strength at the second current zero after contact part is kept low by not pumping during this time (compare Fig. 28) so that even though there is a restrike still no severe overvoltage is impressed on the transmission line 156. At the third current zero, the dielectric strength of the contact gap 173 is sufficient (the pump having started) to hold the increasing potential across the contact gap 173. It is to be observed that the time $t_1$ of imposition of 2E across the contact gap 173 in Fig. 31 is later by the time $t_2$ than the time $t_3$ at which the contact gap of length A is capable of withstanding 2E. Thus, interruption of the circuit is assured at time $t_4$.

What happens if the pump starts at a time $t_5$ within the specified pumping range as indicated by the arrow 194 in Fig. 31? Here again the circuit will be interrupted at $t_4$ because a half cycle later at $t_1$ with the contact gap 173 greater than A and with the pump having worked ½ cycle, the contact gap can readily withstand 2E.

We have applied our invention to an oil circuit interrupter of the type shown in Fig. 1 which controls one phase of a three-phase transmission line having a voltage of 230 kv. from line to line. That is, the voltage between say, transmission lines 156, 157, is 230 kv. The voltage from any transmission line, say, 156 to ground is 132 kv., which imposes a voltage across each arc-extinguishing unit 7 of 66 kv. The interrupter is a three-cycle breaker, that is, the time from the energization of the trip coil to the moment of contact part is 1.4 cycles, and the time from the moment of contact part to the extinction of the arcs and the consequent interruption of the circuit is not over 1.6 cycles. The piston member 127 begins to move downwardly to force oil out of the piston chamber 122 during a charging current interruption when the interrupting gap is substantially 1¼ inches and the pressure generating gap is substantially one inch. In other words, the piston 127 has a time lag after contact part of substantially 0.5 cycle.

From the foregoing description, it is apparent that we have discovered a new method of interrupting charging currents by utilizing a fluid moving means or piston member which is operative only during relatively low currents and after a predetermined time T after contact part. The exact time of initiation of the fluid moving means or piston may be anywhere within the pumping range specified above.

It is clear that our method of interrupting charging currents may be applied to any type of commercial breaker after certain experimental data have been obtained taken in the absence of the pumping means. The contact gap 173 considered in the discussion is merely the summation of the several contact gaps within the breaker for interrupting one pole of the circuit. As applied to the interrupter shown in Figs. 2 and 3, the contact gap 173 is merely the sum of the two pressure-generating breaks and the two interrupting breaks.

In the interrupter embodying our invention, the fluid moving means or piston member 127 is inoperative during the interruption of heavy load currents or short-circuit currents, and is only operative during the interruption of charging currents, magnetizing currents, or relatively low load currents. The pressure produced at the pressure-generating break during the interruption of heavy load currents or short-circuit currents is sufficient to effect a rapid interruption of the interrupting arcs 37 and to effect thereby an interruption of the circuit.

The interruption of a charging current to a high-voltage transmission line is similar to opening the alternating-current charging current to a static capacitor bank. Although voltage builds up slowly at normal system frequency across the contact gap, conventional circuit breakers usually require several cycles of arcing before the double voltage peak 2E reached can be withstood by the dielectric in the contact gap. Delayed restrikes usually occur before final interruption of the circuit, subjecting the transmission line insulation to overvoltage surges, which under certain unfavorable conditions may result in cumulative buildup to 5 or 6 times normal voltage. It is, therefore, very desirable to have a circuit interrupter capable of opening charging currents either at the very first current zero after the contacts part or at least without delayed restrikes of an appreciable magnitude.

One method of eliminating restrikes is to employ a powerful oil driving piston to blast oil into a number of series contact gaps opened simultaneously. By starting the flow of oil before the contacts open, a sufficiently high rate of dielectric can be obtained to assure that the arc will be extinguished at the first current zero after the contacts part. The disadvantage of this scheme is the complication of the multi-break contacts and the large force necessary to provide an adequate oil blast in all of the contact gaps.

The development of the arc extinguishing structure, the operation of which is described in the aforesaid application by Leon R. Ludwig, Benjamin P. Baker, and Winthrop M. Leeds now Patent 2,406,469, issued August 27, 1946, for high voltage oil circuit breakers has made possible high-speed interruption of short circuit currents and voltage as high as 230 kv. with but two arc extinguishing units 7 per pole. When opening charging currents, however, it has been found that with reasonable contact opening speeds the gaps opened in the first half cycle after parting contacts is insufficient in dielectric ability to withstand the double voltage peak 2E even when all arc products are completely replaced by oil using an oil flow piston. Restrikes during such charging current operations, therefore, seemed inevitable until the problem was solved as follows: (1) Build up of dielectric in the contact gap at the first current zero was avoided as much as possible by not pumping oil into the contact gap, and keeping the pressure within the pressure generating chamber 16 down by use of the check valve 20 which is held open by the compression spring 21, the latter being fairly strong. This maintenance of the check valve 20 to its open position maintains the pressure within the pressure-generating chamber 16 to a relatively low value, thereby decreasing the dielectric ability at both the pressure-generating gap and also the interrupting gap. This procedure prevented the possibility of a delayed restrike in the early part of the contact stroke. (2) After a predetermined contact separation was reached, and at a time within the pumping range previously specified, oil flow was started suddenly with sufficient pressure to close the check valve 20, and with sufficient velocity to sweep out the arc products in both the interrupting gap and the pressure-generating gap in a half cycle. Thus, at the next current zero, the elongated contact gap, completely deionized by the oil flow, was able to withstand double voltage 2E, and the circuit was opened.

As many as 15 consecutive interruptions of 45, 90 and 180 amperes of charging current at 66,000 volts across one arc extinguishing unit 7 have been opened without delayed restriking. During the interruption of heavy load currents and during the interruption of short circuit currents, the pressure generated at the pressure-generating arc 35 is sufficient to immediately close the check valves 20 and thus to maintain a high dielectric strength within the pressure generating chamber 16.

After an interrupting operation has been completed, the rotatable pressure generating contact 22 moves to its fully open circuit position indicated by the dotted lines 195, the intermediate contact 34 is lowered to the position shown in Fig. 3, and the lower movable interrupting contact 36 is lowered to the extent that the top thereof assumes the position shown by the dotted lines 196.

From the foregoing description of our invention, it will be apparent that we have provided an improved method for interrupting charging currents utilizing improved delayed action fluid moving means, which delay falls within the interval from ½ cycle before the contact separation gap is of sufficient length to withstand double peak normal voltage when filled with clean fluid, and the time thereafter that the contact separation gap has increased to a length no longer than two times the length of the first-mentioned gap.

In the specification and in the claims the term "charging curent of a transmission line" may be defined as follows: The charging current of a transmission line is the current that flows into the capacitance of a transmission line when voltage is applied at its terminals.

In the specification and in the claims the term "fluid" is intended to cover gases, liquids, vapors and sprays.

Although we have shown and described specific structures, it is to be readily apparent that the same were merely for purposes of illustration and that changes and modifications may readily be made by those skilled in the art without departing from the spirit and scope of the appended claims.

We claim as our invention:

1. In a circuit interrupter, an arc extinguishing unit, a pressure-generating contact disposed adjacent a first end of the unit and cooperable with an intermediate contact to establish a pressure generating arc adjacent the first end of the unit, a lower movable contact movable adjacent the other or second end of the unit and cooperable with the intermediate contact to establish an interrupting arc adjacent the second end of the unit, a piston chamber disposed adjacent the second end of the unit, a piston member operable within the piston chamber, fluid passage means interconnecting the pressure-generating arc with the interrupting arc so that pressure generated at the former arc may be effective to force fluid against the interrupting arc to effect the latter's extinction, second fluid passage means interconnecting the piston chamber with the pressure-generating arc, spring means, a flange member biased by the spring means for movement with said lower movable contact toward open circuit position, and a lost motion connection between the flange member and the piston member arranged to actuate the piston member in timed sequence with respect to the opening movement of said lower movable contact.

2. In a circuit interrupter of the liquid immersed type for alternating current power circuits having an arcing chamber, a pair of coacting contacts and means for moving one of said contacts to establish an arc, the combination of means for interrupting predominantly capacitive current arcs comprising a piston chamber disposed adjacent one end of said arcing chamber and having communication with said arcing chamber, said movable contact extending through said piston chamber, an actuating member surrounding said movable contact and movable relative thereto, means biasing said actuating member for movement with said movable contact in the circuit opening direction, an annular piston in said piston chamber surrounding said actuating member and movable relative thereto at least during the initial portion of the opening stroke, and flange means carried by said actuating member arranged to engage said piston at a predetermined time in the opening stroke whereby said piston is moved by said biasing means during the remaining portion of the opening stroke to force liquid toward said arc and assist in extinguishing the same.

3. In a circuit interrupter, an arc extinguishing unit, a pressure-generating contact disposed adjacent a first end of the unit and cooperable with an intermediate contact to establish a pressure-generating arc adjacent the first end of the unit, a lower movable contact movable adjacent the other or second end of the unit and cooperable with the intermediate contact to establish an interrupting arc adjacent the second end of the unit, a piston chamber disposed adjacent the second end of the unit, a piston member operable within the piston chamber, fluid passage means interconnecting the pressure-generating arc with the interrupting arc so that pressure generated at the former arc may be effective to force fluid against the interrupting arc to effect the latter's extinction, second fluid passage means interconnecting the piston chamber with the pressure-generating arc, spring means biasing the lower movable contact toward the open circuit position, a flange member movable relative to said lower movable contact, a second spring means biasing said flange member in the biased direction of said lower movable contact, and a lost motion connection between the flange member and the piston member arranged to actuate the piston member in timed sequence with respect to the opening movement of said lower movable contact only when the pressure in the region of said pressure-generating arc is below a predetermined magnitude.

4. The method of interrupting an alternating current circuit when carrying predominantly capacitance charging current which comprises, establishing one or more series arcs in the circuit, lengthening one or more of said arcs along a path into which fluid may be forced under pressure to effect deionization of the arc or arcs, delaying the start of such forced fluid flow at least to a time one-half cycle before the arc gap or gaps have attained a length sufficient to withstand double peak normal voltage under conditions of full fluid flow, and initiating the fluid flow at a time not later than the time at which the arc gap or gaps in the path of the injected fluid are twice the length attained at the earliest instant defined above at which the fluid flow may be started to effect circuit interruption.

5. The method of interrupting an alternating current circuit when carrying predominantly capacitance charging current which comprises, establishing one or more series arcs in the circuit, lengthening one or more of said arcs along a path into which liquid may be forced under pressure to effect deionization of the arc or arcs, delaying the start of such forced liquid flow at least to a time one-half cycle before the arc gap or gaps have attained a length sufficient to withstand double peak normal voltage under conditions of full liquid flow, and initiating the liquid flow at a time not later than the time at which the arc gap or gaps in the path of the injected liquid are twice the length attained at the earliest instant defined above at which the liquid flow may be started to effect circuit interruption.

6. A circuit interrupter of the liquid break type including an arc extinguishing unit, means defining a pressure-generating chamber and an interrupting chamber, means establishing a pressure-generating arc within the pressure-generating chamber and a serially related interrupting arc within the interrupting chamber, liquid passage means interconnecting the two chambers so that liquid may flow from the pressure-generating chamber into the interrupting chamber to facilitate the extinction of the interrupting arc therein, a liquid driving piston to force liquid into one or more of the arc gaps, and delaying means to delay actuation of the piston until a time not less than one-half cycle before the sum of the arc gaps have sufficient dielectric strength under conditions of piston flow to withstand double peak normal voltage and a time not later than the time at which the arc gap or gaps in the path of the injected liquid are twice the length attained at the earliest instant defined above at which piston flow may be started.

7. A circuit interrupter of the liquid break type including means for establishing one or more series arcs in the circuit, a liquid driving piston to force liquid into one or more of the arc gaps, and delaying means to delay actuation of the piston until a time not less than one-half cycle before the sum of the arc gaps have sufficient dielectric strength under conditions of piston flow to withstand double peak normal voltage and a time not later than the time at which the arc gap or gaps in the path of the injected liquid are twice the length attained at the earliest instant defined above at which piston flow may be started.

8. A circuit interrupter of the fluid flow type including means for establishing one or more series arcs in the circuit, fluid forcing means for forcing fluid into one or more of the arc gaps, and delaying means to delay actuation of the fluid forcing means until a time not less than one-half cycle before the sum of the arc gaps have sufficient dielectric strength under conditions of forced fluid flow to withstand double peak normal voltage and a time not later than the time at which the arc gap or gaps in the path of the injected fluid are twice the length attained at the earliest instant defined above at which forced fluid flow may be started.

9. A circuit interrupter of the liquid break type including means for establishing one or more series arcs in the circuit, a liquid driving piston operable only during the interruption of currents below a predetermined magnitude of the order of charging currents to force liquid into one or more of the arc gaps, and delaying means to delay actuation of the piston until a time not less than one-half cycle before the sum of the arc gaps have sufficient dielectric strength under conditions of piston flow to withstand double peak normal voltage and a time not later than the time at which the arc gap or gaps in the path of the injected liquid are twice the length attained at the earliest instant defined above at which piston flow may be started.

10. A circuit interrupter of the fluid flow type including means for establishing one or more series arcs in the circuit, fluid forcing means operable only during the interruption of currents below a predetermined magnitude of the order of charging currents for forcing fluid into one or more of the arc gaps, and delaying means to delay actuation of the fluid forcing means until a time not less than one-half cycle before the sum of the arc gaps have sufficient dielectric strength under conditions of forced fluid flow to withstand double peak normal voltage and a time not later than the time at which the arc gap or gaps in the path of the injected fluid are twice the length attained at the earliest instant defined above at which forced fluid flow may be started.

11. A circuit interrupter of the liquid break type including an arc extinguishing unit, means defining a pressure-generating chamber and an interrupting chamber, means establishing a pressure-generating arc within the pressure-generating chamber and a serially related interrupting arc within the interrupting chamber, liquid passage means interconnecting the two chambers so that liquid may flow from the pressure-generating chamber into the interrupting chamber to facilitate the extinction of the interrupting arc therein, a liquid driving piston operable only during the interruption of currents below a predetermined magnitude of the order of charging currents to force liquid into one or more of the arc gaps, and delaying means to delay actuation of the piston until a time not less than one-half cycle before the sum of the arc gaps have sufficient dielectric strength under conditions of piston flow to withstand double peak normal voltage and a time not later than the time at which the arc gap or gaps in the path of the injected liquid are twice the length attained at the earliest instant defined above at which piston flow may be started.

WINTHROP M. LEEDS.
ROBERT E. FRIEDRICH.
FRANCIS J. FRY.

REFERENCES CITED

The following references are of record in the file of this patent:

UNITED STATES PATENTS

| Number | Name | Date |
|---|---|---|
| Re. 16,912 | Hilliard | Mar. 20, 1928 |
| 1,305,142 | Mahoney | May 27, 1919 |
| 1,645,288 | MacNeill | Oct. 11, 1927 |
| 2,025,549 | Prince | Dec. 24, 1935 |
| 2,258,226 | Skeats | Oct. 7, 1941 |
| 2,406,469 | Ludwig et al. | Aug. 27, 1946 |
| 2,412,858 | Baker et al. | Dec. 17, 1946 |
| 2,420,888 | Leeds | May 20, 1947 |
| 2,422,569 | Leeds | June 17, 1947 |
| 2,424,343 | Van Sickle et al. | July 22, 1947 |